Patented Oct. 24, 1933

1,931,819

UNITED STATES PATENT OFFICE

1,931,819

MIXED FERTILIZER

Leopold Hecht, Ludwigshafen - on - the - Rhine, Germany, assignor to I. G. Farbenindustrie Aktiengesellschaft, Frankfort-on-the-Main, Germany, a corporation of Germany No Drawing. Application August 9, 1926, Serial No. 128,329, and in Germany August 14, 1925

8 Claims. (Cl. 71—9)

I have found that readily storable and spreadable mixed fertilizers can be obtained from ammonium nitrate by mixing it with diammonium phosphate. The mixed fertilizer so obtained does not grow moist and does not form hard masses even when stored for a long time; it is of great importance commercially as it contains both nitrogen and phosphoric acid in a completely water-soluble form; this fact is of particular importance, as superphosphate which is the usually employed fertilizer rich in phosphoric acid, cannot be mixed with ammonium nitrate by reason of its acid reaction.

In the said mixtures of ammonium nitrate and diammonium phosphate the proportions of the components may be varied within wide limits.

I have further found that potassium or calcium salts may be added to the said mixtures without the valuable properties of the fertilizers being influenced in an unfavorable direction. Thereby fertilizers are obtained which contain all chief plant nutrients, viz. nitrogen, phosphoric acid and potassium or calcium, and in which the proportions of these nutrients may be varied as desired. Mixtures of ammonium nitrate, diammonium phosphate and potassium chlorid or sulfate are of particular value, as they contain all components in a water-soluble form. The proportions of nitrogen, $P_2O_5$ and $K_2O$ will generally be so chosen as to be about within a ratio of 1 to between 0.5 and 3 to between 1 and 5, but any other ratio may also be suitable.

The mixed fertilizers according to this invention may be prepared for example by mixing the components in the solid state. Or, diammonium phosphate and, if desired, other components are added in the solid state to a hot concentrated solution of ammonium nitrate and from the resulting mixture the dry fertilizer ready for use may be obtained by spraying or by cooling or in any other suitable manner. In some cases, it is also possible to make each, the ammonium nitrate solution and the components to be admixed thereto, into a spray so that the resulting sprays mix with each other and the mixed solid product is directly obtained. Or, the hot ammonium nitrate solution is mixed with the potassium or calcium salt, solidified by cooling or spraying or the like and mixed with solid diammonium phosphate. In all cases, hot concentrated diammonium phosphate solutions may be employed instead of the solid salt.

In the following, some examples of very valuable fertilizing mixtures according to the present invention are given, but it is to be understood that the invention is in no way limited to these examples. The parts are by weight.

Example 1

By intimately mixing 100 parts of diammonium phosphate with 88 parts of ammonium nitrate, a mixed fertilizer containing about 27 per cent of nitrogen and about 27 per cent of $P_2O_5$ is obtained. By employing for example 100 parts of diammonium phosphate and 150 parts of ammonium nitrate instead of the proportions indicated above, a fertilizer containing about 29 per cent of nitrogen and 20 per cent of $P_2O_5$ is obtained. The fertilizers here described may be mixed with other salts for example ammonium sulfate or other fertilizing nitrogen compounds without their properties being impaired, for example a mixture remaining dry and readily spreadible is obtained by mixing 100 parts of diammonium phosphate with 110 parts of ammonium nitrate and 70 parts of ammonium sulfate; this fertilizer contains about 26 per cent of nitrogen and 18 per cent of $P_2O_5$.

Example 2

100 parts of diammonium phosphate are mixed with 131 parts of ammonium nitrate and between 163 and 812 parts of crude potassium salt containing 40 per cent of $K_2O$; thereby fertilizers are obtained in which the proportions of nitrogen, $P_2O_5$ and $K_2O$ vary within a ratio of 1:0.75:1 to 5; when employing for example 163 parts of the said potassium salt, the resulting mixture contains about 16.5 per cent of nitrogen, 12.5 per cent of $P_2O_5$ and 16.5 per cent of $K_2O$, while when employing 812 parts of the crude potassium salt, the fertilizer contains about 6.5 per cent of nitrogen, 4.5 per cent of $P_2O_5$ and 32.5 per cent of $K_2O$.

Example 3

100 parts of diammonium phosphate are mixed with 14 parts of ammonium nitrate and between 60 and 300 parts of the crude potassium salt mentioned above. The resulting fertilizers contain nitrogen, $P_2O_5$ and $K_2O$ in a ratio of about 1:2:1 to 5; for example by employing 60 parts of the said potassium salt, a fertilizer is obtained which contains about 14 per cent of nitrogen, 28 per cent of $P_2O_5$ and 14 per cent of $K_2O$, while with 300 parts of the said potassium salt, a mixture containing 6 per cent of nitrogen, 12 per cent of $P_2O_5$ and 30 per cent of $K_2O$ is obtained.

The potassium salt mentioned above in Examples 2 and 3 may be replaced by a corresponding quantity of a crude potassium salt containing 50 per cent of $K_2O$.

*Example 4*

140 parts of a hot ammonium nitrate solution of 95 per cent strength are mixed with 230 parts of crude potassium chlorid containing 50 per cent of $K_2O$ and 100 parts of diammonium phosphate. A dry, readily spreadable product containing about 14 per cent of nitrogen, 10 per cent of $P_2O_5$ and 25 per cent of $K_2O$ is obtained.

*Example 5*

100 parts of a hot ammonium nitrate solution of 95 per cent strength are mixed with 115 parts of a hot diammonium phosphate solution of 85 per cent strength and with 160 parts of crude potassium chloride or sulfate containing 50 per cent of $K_2O$. The resulting slightly moist mass is dried in a suitable drying apparatus whereby a readily spreadable product containing about 15 per cent of nitrogen, 15 per cent of $P_2O_5$ and 22 per cent of $K_2O$ is obtained.

*Example 6*

140 parts of a hot ammonium nitrate solution of 95 per cent strength are mixed with 160 parts of crude potassium chlorid or sulfate containing 50 per cent of $K_2O$. 100 parts of solid diammonium phosphate are then admixed to the resulting mass. A readily spreadable product is directly obtained which contains about 16 per cent of nitrogen, 12 per cent of $P_2O_5$ and 20 per cent of $K_2O$.

In the above examples the proportions of the components may be varied within wide limits.

I claim:

1. A mixed fertilizer comprising ammonium nitrate and diammonium phosphate.
2. A mixed fertilizer comprising ammonium nitrate, diammonium phosphate and a fertilizing salt of a metal selected from the group consisting of potassium and calcium.
3. A mixed fertilizer comprising ammonium nitrate, diammonium phosphate and a fertilizing salt of a metal selected from the group consisting of potassium and calcium with a mineral acid other than nitric acid and phosphoric acid.
4. A mixed ballast-free fertilizer comprising ammonium nitrate and diammonium phosphate.
5. A mixed fertilizer comprising diammonium phosphate and in addition thereto ammonium and potassium, combined with nitric acid and an acid selected from the group consisting of hydrochloric acid and sulphuric acid.
6. A mixed fertilizer comprising diammonium phosphate and in addition thereto ammonium and potassium, combined with nitric acid and an acid selected from the group consisting of hydrochloric acid and sulphuric acid, said fertilizer containing nitrogen, $P_2O_5$ and $K_2O$ in a ratio of about 1:between 0.5 and 3:between 1 and 5.
7. A mixed fertilizer comprising diammonium phosphate and in addition thereto ammonium and potassium combined with nitric acid and hydrochloric acid.
8. A mixed ballast-free fertilizer comprising diammonium phosphate and in addition thereto ammonium and potassium combined with nitric acid and hydrochloric acid, said fertilizer containing nitrogen, $P_2O_5$ and $K_2O$ in a ratio of about 1:between 0.5 and 3:between 1 and 5.

LEOPOLD HECHT.

CERTIFICATE OF CORRECTION.

Patent No. 1,931,819.　　　　　　　　　　　　　　　　October 24, 1933.

LEOPOLD HECHT.

It is hereby certified that error appears in the printed specification of the above numbered patent requiring correction as follows: Page 1, lines 24 and 25, after "desired." insert the sentence Because of the method followed in compounding this fertilizer there are no substances present which are not useful as plant food, or, in other words, the fertilizers are ballast free.; and that the said Letters Patent should be read with this correction therein that the same may conform to the record of the case in the Patent Office.

Signed and sealed this 3rd day of April, A. D. 1934.

F. M. Hopkins (Seal)　　　　　　　　　　　　　　　　Acting Commissioner of Patents.

ing quantity of a crude potassium salt containing 50 per cent of K₂O.

Example 4

140 parts of a hot ammonium nitrate solution of 95 per cent strength are mixed with 230 parts of crude potassium chlorid containing 50 per cent of K₂O and 100 parts of diammonium phosphate. A dry, readily spreadable product containing about 14 per cent of nitrogen, 10 per cent of P₂O₅ and 25 per cent of K₂O is obtained.

Example 5

100 parts of a hot ammonium nitrate solution of 95 per cent strength are mixed with 115 parts of a hot diammonium phosphate solution of 85 per cent strength and with 160 parts of crude potassium chloride or sulfate containing 50 per cent of K₂O. The resulting slightly moist mass is dried in a suitable drying apparatus whereby a readily spreadable product containing about 15 per cent of nitrogen, 15 per cent of P₂O₅ and 22 per cent of K₂O is obtained.

Example 6

140 parts of a hot ammonium nitrate solution of 95 per cent strength are mixed with 160 parts of crude potassium chlorid or sulfate containing 50 per cent of K₂O. 100 parts of solid diammonium phosphate are then admixed to the resulting mass. A readily spreadable product is directly obtained which contains about 16 per cent of nitrogen, 12 per cent of P₂O₅ and 20 per cent of K₂O.

In the above examples the proportions of the components may be varied within wide limits.

I claim:

1. A mixed fertilizer comprising ammonium nitrate and diammonium phosphate.

2. A mixed fertilizer comprising ammonium nitrate, diammonium phosphate and a fertilizing salt of a metal selected from the group consisting of potassium and calcium.

3. A mixed fertilizer comprising ammonium nitrate, diammonium phosphate and a fertilizing salt of a metal selected from the group consisting of potassium and calcium with a mineral acid other than nitric acid and phosphoric acid.

4. A mixed ballast-free fertilizer comprising ammonium nitrate and diammonium phosphate.

5. A mixed fertilizer comprising diammonium phosphate and in addition thereto ammonium and potassium, combined with nitric acid and an acid selected from the group consisting of hydrochloric acid and sulphuric acid.

6. A mixed fertilizer comprising diammonium phosphate and in addition thereto ammonium and potassium, combined with nitric acid and an acid selected from the group consisting of hydrochloric acid and sulphuric acid, said fertilizer containing nitrogen, P₂O₅ and K₂O in a ratio of about 1:between 0.5 and 3:between 1 and 5.

7. A mixed fertilizer comprising diammonium phosphate and in addition thereto ammonium and potassium combined with nitric acid and hydrochloric acid.

8. A mixed ballast-free fertilizer comprising diammonium phosphate and in addition thereto ammonium and potassium combined with nitric acid and hydrochloric acid, said fertilizer containing nitrogen, P₂O₅ and K₂O in a ratio of about 1:between 0.5 and 3:between 1 and 5.

LEOPOLD HECHT.

CERTIFICATE OF CORRECTION.

Patent No. 1,931,819.                                  October 24, 1933.

LEOPOLD HECHT.

It is hereby certified that error appears in the printed specification of the above numbered patent requiring correction as follows: Page 1, lines 24 and 25, after "desired." insert the sentence Because of the method followed in compounding this fertilizer there are no substances present which are not useful as plant food, or, in other words, the fertilizers are ballast free.; and that the said Letters Patent should be read with this correction therein that the same may conform to the record of the case in the Patent Office.

Signed and sealed this 3rd day of April, A. D. 1934.

F. M. Hopkins (Seal)                                       Acting Commissioner of Patents.

CERTIFICATE OF CORRECTION.

Patent No. 1,931,819.  October 24, 1933.

LEOPOLD HECHT.

It is hereby certified that error appears in the printed specification of the above numbered patent requiring correction as follows: Page 1, lines 24 and 25, after "desired." insert the sentence Because of the method followed in compounding this fertilizer there are no substances present which are not useful as plant food, or, in other words, the fertilizers are ballast free.; and that the said Letters Patent should be read with this correction therein that the same may conform to the record of the case in the Patent Office.

Signed and sealed this 3rd day of April, A. D. 1934.

F. M. Hopkins (Seal) Acting Commissioner of Patents.